US012658339B2

(12) United States Patent
Yi et al.

(10) Patent No.: US 12,658,339 B2
(45) Date of Patent: Jun. 16, 2026

(54) THICKNESS DIRECTION CONDUCTIVE LAMINATED COMPOSITE MATERIAL AND MANUFACTURING METHOD THEREFOR

(71) Applicants: BEIJING MEGA MATERIAL INNOVATION WORK (M2IW) CO., LTD., Beijing (CN); THE UNIVERSITY OF NOTTINGHAM NINGBO CHINA, Ningbo (CN)

(72) Inventors: Xiaosu Yi, Beijing (CN); Yongmin Xiao, Beijing (CN); Chris Rudd, Zhejiang (CN); Xiaoling Liu, Zhejiang (CN); Qinghua Liao, Beijing (CN); Xiaoye Cong, Zhejiang (CN); Chenkai Zhu, Zhejiang (CN); Xuegang Ma, Beijing (CN)

(73) Assignees: BEIJING MEGA MATERIAL INNOVATION WORK (M2IW) CO., LTD, Beijing (CN); THE UNIVERSITY OF NOTTINGHAM NINGBO CHINA, Ningbo (CN); NINGBO NOTTINGHAM NEW MATERIALS INSTITUTE CO., LTD., Ningbo (CN)

( * ) Notice: Subject to any disclaimer, the term of this patent is extended or adjusted under 35 U.S.C. 154(b) by 1185 days.

(21) Appl. No.: 17/059,743

(22) PCT Filed: Jun. 1, 2018

(86) PCT No.: PCT/CN2018/089571
§ 371 (c)(1),
(2) Date: May 13, 2021

(87) PCT Pub. No.: WO2019/227474
PCT Pub. Date: Dec. 5, 2019

(65) Prior Publication Data
US 2022/0270780 A1 Aug. 25, 2022

(51) Int. Cl.
| | |
|---|---|
| *H01B 1/24* | (2006.01) |
| *B32B 5/02* | (2006.01) |
| *H01B 13/00* | (2006.01) |

(52) U.S. Cl.
CPC ............... *H01B 1/24* (2013.01); *B32B 5/024* (2013.01); *H01B 13/0036* (2013.01);
(Continued)

(58) Field of Classification Search
CPC ...... H01B 1/24; H01B 13/0036; B32B 5/024; B32B 2260/023; B32B 2260/048;
(Continued)

(56) References Cited

U.S. PATENT DOCUMENTS

| | | | |
|---|---|---|---|
| 2012/0091484 A1 | 4/2012 | Lee et al. | |
| 2013/0005208 A1* | 1/2013 | Retz ......................... | B32B 5/22 |
| | | | 442/205 |

(Continued)

FOREIGN PATENT DOCUMENTS

| | | | |
|---|---|---|---|
| CN | 101492015 A | * | 7/2009 |
| CN | 105172257 A | * | 12/2015 |

(Continued)

OTHER PUBLICATIONS

Int'l Search Report appln No. PCT/CN2018/089571 mailed Feb. 14, 2019.

*Primary Examiner* — Matthew D Matzek
(74) *Attorney, Agent, or Firm* — MCANDREWS HELD & MALLOY, LTD

(57) ABSTRACT
A thickness direction conductive laminated composite material, comprising: laminated multiple layers of carbon fiber; a curable resin which is disposed among the laminated multiple layers of carbon fiber, coats the laminated multiple layers of carbon fiber and bonds the laminated multiple layers of carbon fiber together; and a conductive material,
(Continued)

the conductive material comprising at least one of the followings: a conductive fiber woven together with the carbon fiber, an interlayer conductive film, an interlayer conductive Z-pin and an interlayer conductive particle. The carbon fiber accounts for 40 vol % or more of the thickness direction conductive laminated composite material. The thickness direction conductive laminated composite material has higher thickness direction conductivity, planar conductivity and electric energy transmission performance than traditional laminated composite materials.

12 Claims, 3 Drawing Sheets

(52) U.S. Cl.
CPC ... *B32B 2260/023* (2013.01); *B32B 2260/048* (2013.01); *B32B 2262/106* (2013.01); *B32B 2307/202* (2013.01); *B32B 2307/732* (2013.01)

(58) Field of Classification Search
CPC ........ B32B 2262/106; B32B 2307/202; B32B 2307/732; B32B 2255/02; B32B 5/275; B32B 2255/10; B32B 2255/12; B32B 5/022; B32B 5/245; B32B 5/263; B32B 27/12; B32B 29/02; B32B 2255/102; B32B 2255/205; B32B 2260/046; B32B 2262/0261; B32B 2262/0276; B32B 2262/101; B32B 2262/103; B32B 2262/148; B32B 2262/16; B32B 2605/18; B32B 5/18; Y02E 40/60
USPC .............................. 428/299.1; 442/179, 265
See application file for complete search history.

(56) References Cited

U.S. PATENT DOCUMENTS

| | | | | |
|---|---|---|---|---|
| 2013/0102217 | A1* | 4/2013 | Jeon ...................... | D03D 15/47 |
| | | | | 442/205 |
| 2016/0082691 | A1* | 3/2016 | Restuccia .............. | B32B 37/06 |
| | | | | 442/379 |
| 2016/0347918 | A1* | 12/2016 | Le ......................... | B29C 70/302 |
| 2018/0163112 | A1* | 6/2018 | Watanabe ............. | B32B 27/281 |

FOREIGN PATENT DOCUMENTS

| | | |
|---|---|---|
| CN | 107825780 A | 3/2018 |
| JP | 2017088792 A | 5/2017 |

* cited by examiner

THICKNESS DIRECTION CONDUCTIVE LAMINATED COMPOSITE MATERIAL AND MANUFACTURING METHOD THEREFOR

The application is a U.S. National Phase Entry of International Application No. PCT/CN2018/089571 filed on Jun. 1, 2018, designating the United States of America. The present application claims the benefit of the above-identified application which is hereby incorporated by reference herein in its entirety.

TECHNICAL FIELD

The present disclosure relates to a thickness direction conductive laminated composite material, and a manufacturing method and an application thereof.

BACKGROUND

Thermosetting resin-based laminated composite materials are widely used in the manufacture of aircraft airframes. As a material for manufacturing aircraft fuselage, impact resistance is one of its most critical properties. While improving the impact resistance of thermosetting resin-based laminated composite materials through various methods, it is also necessary to improve the ability to shield electronic interference and the ability to protect against lightning strikes.

SUMMARY

In an embodiment, the present disclosure provides a thickness direction conductive laminated composite material, wherein the thickness direction conductive laminated composite material includes: laminated multiple layers of carbon fibers, a curable resin which is disposed among the multiple layers of carbon fibers, coats the multiple layers of carbon fibers and bonds the multiple layers of carbon fibers together, and a electrically conductive material, wherein the electrically conductive material includes at least one of the following: a electrically conductive fiber woven together with the carbon fiber; an interlayer electrically conductive film; an interlayer electrically conductive Z-pin; and an interlayer electrically conductive particle; and the carbon fiber accounts for 40 vol % or more of the thickness direction conductive laminated composite material.

In one embodiment, for example, in each layer of the laminated multiple layers of carbon fibers, the electrically conductive fiber is cross-woven and/or parallel-woven with the carbon fiber.

In one embodiment, for example, the electrically conductive fiber is cross-woven with the carbon fiber; in the direction perpendicular to the length of the electrically conductive fiber, 1-5 electrically conductive fibers are included every 10 mm; and the diameter of the electrically conductive fiber is 0.005 mm-0.5 mm.

In one embodiment, for example, in the direction perpendicular to the length of the electrically conductive fiber, 3 electrically conductive fibers are included every 10 mm; and the diameter of the electrically conductive fiber is 0.01 mm-0.3 mm.

In one embodiment, for example, the electrically conductive fiber is parallel-woven with the carbon fiber; the parallel weaving includes intra-bundle weaving and/or inter-bundle weaving; in the direction perpendicular to the length of the electrically conductive fiber, 1-5 electrically conductive fibers are included every 10 mm; and the diameter of the electrically conductive fiber is 0.05 mm-0.5 mm.

In an embodiment, for example, in the direction perpendicular to the length of the electrically conductive fiber, 3 electrically conductive fibers are included every 10 mm; and the diameter of the electrically conductive fiber is 0.01 mm-0.3 mm.

In one embodiment, for example, the electrically conductive fiber includes at least one of: a glass fiber metalized on the surface, an organic fiber metalized on the surface, a carbon nanotube yarn metalized on the surface, and an ultrafine metal fiber.

In one embodiment, for example, the interlayer electrically conductive film includes at least one of: a porous polymer film metalized on the surface, a non-woven fabric metalized on the surface, a fabric metalized on the surface, a paper metalized on the surface, and a polymer foam metalized on the surface.

In one embodiment, for example, the thickness of the interlayer electrically conductive film is 0.01 mm-0.2 mm.

In one embodiment, for example, the interlayer electrically conductive Z-pin includes a composite Z-pin metalized on the surface or a metal Z-pin, wherein the Z-pin is inserted into but does not penetrate through the curable resin between two adjacent layers of carbon fibers.

In one embodiment, for example, the interlayer electrically conductive particle includes a polymer particle metalized on the surface, an inorganic crystal particle metalized on the surface, a hollow glass bead metalized on the surface, and a metal particle, wherein the diameter of the polymer particle metalized on the surface, the inorganic crystal particle metalized on the surface, and the metal particle is 10 μm-50 μm; and the diameter of the hollow glass bead metalized on the surface is 50 μm-100 μm.

In one embodiment, for example, the interlayer electrically conductive particle includes a zinc oxide whisker (ZnO Whisker) metalized on the surface, and the profile dimension of the zinc oxide whisker metalized on the surface is 50 μm-250 μm.

In one embodiment, for example, the electrically conductive material includes: a electrically conductive fiber woven together with the carbon fiber, and an interlayer electrically conductive film.

In one embodiment, for example, the curable resin includes epoxy resin, vinyl resin, bismaleimide, polyimide, unsaturated polyester, or benzoxazine.

In an embodiment, the present disclosure also provides a method of manufacturing a thickness direction conductive laminated composite material, comprising:

1) laying multiple layers of carbon fibers in a stack to obtain laminated multiple layers of carbon fibers;

2) pre-impregnating the laminated multiple layers of carbon fibers with a curable resin to obtain a prepreg of a laminated multiple layers of carbon fibers;

3) curing the curable resin, wherein the carbon fiber accounts for 40 vol % or more of the finally obtained thickness direction conductive laminated composite material;

wherein the method further comprises a step of setting a electrically conductive material, which comprises at least one of the following: before the step 1), interweaving the electrically conductive fiber with the carbon fiber; after the step 1) and before the step 2), or after the step 2) and before the step 3), inserting an interlayer electrically conductive film; after the step 2) and before the step 3), setting an interlayer electrically conductive Z-pin; after the step 1) and before the step 2), or after the step 2) and before the step 3), adding an interlayer electrically conductive particle.

In one embodiment of the method, for example, the step of setting a electrically conductive material comprises: before the step 1), interweaving the electrically conductive fiber with the carbon fiber; and after the step 1) and before the step 2), or after the step 2) and before the step 3), inserting the interlayer electrically conductive film.

In one embodiment of the method, for example, the electrically conductive fiber is cross-woven and/or parallel-woven with the carbon fiber in each layer of the laminated multiple layers of carbon fibers.

In one embodiment of the method, for example, the electrically conductive fiber is cross-woven with the carbon fiber; in the direction perpendicular to the length of the electrically conductive fiber, 1-5 electrically conductive fibers are included every 10 mm; and the diameter of the electrically conductive fiber is 0.005 mm-0.5 mm.

In one embodiment of the method, for example, 3 electrically conductive fibers are included every 10 mm in the direction perpendicular to the length of the electrically conductive fiber; and the diameter of the electrically conductive fiber is 0.1 mm-0.3 mm.

In one embodiment of the method, for example, the electrically conductive fiber is parallel-woven with the carbon fiber; the parallel weaving includes intra-bundle weaving and/or inter-bundle weaving; 1-5 electrically conductive fibers are included every 10 mm in the direction perpendicular to the length of the electrically conductive fiber; and the diameter of the electrically conductive fiber is 0.005 mm-0.5 mm.

In one embodiment of the method, for example, 3 electrically conductive fibers are included every 10 mm in the direction perpendicular to the length of the electrically conductive fiber; and the diameter of the electrically conductive fiber is 0.01 mm-0.3 mm.

In one embodiment of the method, for example, the electrically conductive fiber includes at least one of: a glass fiber metalized on the surface, an organic fiber metalized on the surface, a carbon nanotube yarn metalized on the surface, and an ultrafine metal fiber.

In one embodiment of the method, for example, the interlayer electrically conductive film includes at least one of: a porous polymer film metalized on the surface, a non-woven fabric metalized on the surface, a fabric metalized on the surface, a paper metalized on the surface, and a polymer foam metalized on the surface.

In one embodiment of the method, for example, the thickness of the interlayer electrically conductive film is 0.01 mm-0.2 mm.

In one embodiment of the method, for example, the interlayer electrically conductive Z-pin includes a composite Z-pin metalized on the surface or a metal Z-pin, wherein the Z-pin is inserted into but does not penetrate through the curable resin between two adjacent layers of carbon fibers.

In one embodiment of the method, for example, the interlayer electrically conductive particle includes a polymer particle metalized on the surface, an inorganic crystal particle metalized on the surface, a hollow glass bead metalized on the surface, and a metal particle, wherein the diameter of the polymer particle metalized on the surface, the inorganic crystal particle metalized on the surface, and the metal particle is 10 μm-50 μm; and the diameter of the hollow glass bead metalized on the surface is 50 μm-100 μm.

In one embodiment of the method, for example, the interlayer electrically conductive particle includes a zinc oxide whisker (ZnO Whisker) metalized on the surface, and the profile dimension of the zinc oxide whisker metalized on the surface is 50 μm-250 μm.

In one embodiment of the method, for example, the curable resin includes epoxy resin, vinyl resin, bismaleimide, polyimide, unsaturated polyester, or benzoxazine.

BRIEF DESCRIPTION OF THE DRAWINGS

In order to explain the technical solutions of embodiments of the present disclosure more clearly, the drawings of the embodiments will be briefly introduced below. Apparently, the drawings described below only relate to some embodiments of the present disclosure, rather than limit the present disclosure.

DETAILED DESCRIPTION OF THE EMBODIMENTS

Figure 1:
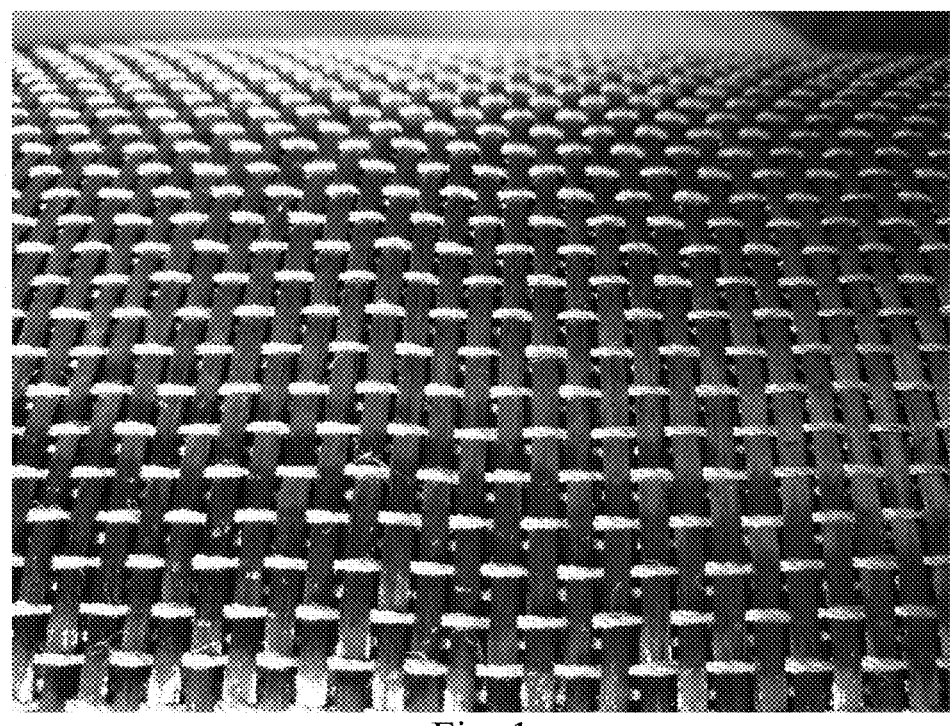
FIG. 1 is an appearance view of a cross-woven layer of a silver-coated polyester fiber and a carbon fiber according to an embodiment of the present disclosure.

In order to make the objectives, technical solutions, and advantages of the embodiments of the present disclosure more clear, the technical solutions of the embodiments of the present disclosure will be described clearly and completely in conjunction with the drawings of the embodiments of the present disclosure. Apparently, the described embodiments are part of the embodiments of the present disclosure, rather than all of the embodiments. Based on the described embodiments of the present disclosure, all other embodiments obtained by a person of ordinary skill in the art without creative work shall fall within the protection scope of the present disclosure.

Unless otherwise defined, the technical terms or scientific terms used in this disclosure shall have the usual meanings understood by those with ordinary skills in the field to which the present disclosure belongs.

Since the main structure of the thermosetting resin-based laminated composite material is usually an electrically non-conductive polymer material, the thermosetting resin-based laminated composite material usually has a poor ability of shielding electronic interference and lightning protection. In order to improve the ability of shielding electronic interference and lightning protection, it is necessary to improve the electrical conductivity of the thermosetting resin-based laminated composite material, especially the electrical conductivity in the thickness direction. However, while the current existing technologies improve the electrical conductivity of thermosetting resin-based laminated composite material, they tend to impair its impact resistance. Therefore, the present disclosure attempts to provide a laminated composite material that can improve the electrical conductivity of the thermosetting resin-based laminated composite material without damage to its impact resistance, or even can improve its impact resistance.

It is worth pointing out that the in-plane conductivity and the electrical power transmission performance of the thickness direction conductive laminated composite material are also higher than those of the traditional laminated composite material.

Example 1: A Laminated Composite Material Electrically Conductive in the Thickness Direction, Including Electrically Conductive Fibers Cross-Woven with Carbon Fibers Preparing electrically conductive fiber. A polyester fiber was prepared, and a layer of metallic silver was vapor-deposited on the surface of the polyester fiber to obtain a polyester fiber coated with silver on the surface (that is, the surface was metalized). It should be noted that, as the inner main material of the electrically conductive fiber, it was not limited to the above-mentioned polyester fiber, but other similar materials such as glass fiber, organic fiber, carbon nanotube filament, etc. can also be used; the method of surface metallization was not limited to the above-mentioned vapor deposition method, but other methods such as chemical plating, brush coating, etc. can also be used; the metal covering the surface of the inner main material of the above-mentioned electrically conductive fiber was not limited to silver, but other electrically conductive metals such as copper, nickel, etc. can also be used.

The silver-coated polyester fibers obtained above were cross-woven (also called unidirection-woven) with T700 unidirectional carbon fiber fabric (manufactured by Toray), wherein in the direction perpendicular to the length of the silver-coated polyester fiber, three silver-coated polyester fibers were included every 10 mm; the diameter of the silver-coated polyester fibers was 0.3 mm, and a cross-woven layer of silver-coated polyester fibers and T700 carbon fibers was obtained, whose appearance was shown in FIG. 1. Multiple cross-woven layers of silver-coated polyester fibers and T700 carbon fibers were stacked. Since the surface of the silver-coated polyester fiber had slightly convex electrically conductive contact points, these contact points were in contact with each other to form a current path in the thickness direction when two cross-woven layers of silver-coated polyester fibers and T700 carbon fibers were stacked. By measuring the resistance of two layers of fabric in the vertical direction with a multimeter, the measured resistance value was close to 0 ohm.

Eight cross-woven layers of silver-coated polyester fibers and T700 carbon fibers were stacked. The above-mentioned stacked layers were then pre-impregnated with epoxy resin, and heated to 120° C. to cure the epoxy resin to obtain a laminated composite material electrically conductive in the thickness direction. By measuring the resistance in the vertical direction with a multimeter, the measured resistance value was about 3 ohms.

It should be noted that in addition to the epoxy resin, other curable resins such as vinyl resin, bismaleimide, polyimide, unsaturated polyester, benzoxazine, etc. can also be used as the curable resin. As the above-mentioned pre-impregnation method, conventional pre-impregnation methods such as dry method and wet method can also be used.

Example 2: A Laminated Composite Material Electrically Conductive in the Thickness Direction, Including Electrically Conductive Fibers Cross-Woven with Carbon Fibers In this example, the method of making the laminated composite material electrically conductive in the thickness direction was basically the same as that of Example 1, except for the diameter and weaving density of the silver-coated polyester fiber: in the direction perpendicular to the length of the silver-coated polyester fiber, 4 silver-coated polyester fibers were included every 10 mm; and the diameter of the silver-coated polyester fibers was 0.4 mm. The electrical resistance in the vertical direction of the laminated composite material electrically conductive in the thickness direction finally obtained was measured with a multimeter to be about 2 ohms. Compared with Example 1, due to the increase in the diameter and weaving density of the silver-coated polyester fiber, there were more current paths in the thickness direction of the laminated composite material, and thus the electrical resistance was further reduced. It can be inferred that if the diameter and weaving density of the silver-coated polyester fiber are further increased, the electrical resistance in the thickness direction of the laminated composite material will be further reduced. However, the diameter and weaving density of the silver-coated polyester fiber cannot be increased indefinitely. The reason is that excessive use of the silver-coated polyester fiber will squeeze the space of the carbon fiber, resulting in a reduction in the amount of carbon fiber, which ultimately affects the strength of the laminated composite material. It was determined through experiments that the proper range of the amount of electrically conductive fibers used is: in the direction perpendicular to the length of the electrically conductive fiber, 1 to 5 electrically conductive fibers are included every 10 mm; and the diameter of the electrically conductive fiber is 0.05 mm-0.5 mm.

Example 3: A Laminated Composite Material Electrically Conductive in the Thickness Direction, Including Electrically Conductive Fibers Parallel-Woven (also Called "In-Plane" Woven) with Carbon Fibers In this example, the method of making the laminated composite material electrically conductive in the thickness direction was basically the same as that of Example 1, except that Example 1 used unidirectional carbon fiber fabric, whereas this example used non-unidirectional carbon fiber (plain) fabric (or called in-plane mixed woven fabric). In a weaving manner including intra-bundle weaving or inter-bundle weaving, etc., the electrically conductive fibers were mixedly woven into the above non-unidirectional carbon fiber (plain) fabric to obtain a non-unidirectional carbon fiber-electrically conductive fiber fabric. The intra-bundle weaving refers to the mixed weaving (commingling) of the electrically conductive fibers into the carbon fiber bundle, that is, the electrically conductive fibers and the carbon fibers are in close contact in the bundle; and the inter-bundle weaving means that the electrically conductive fibers are not woven into the carbon fiber bundle, but mixedly woven into a plain fabric with the carbon fiber bundles, that is, the electrically conductive fibers and the carbon fibers are not in close contact. Similarly, the diameter and weaving density of the electrically conductive fibers determined the electrical conductivity of the final laminated composite material electrically conductive in the thickness direction. The electrical resistance in the vertical direction of the final laminated composite material electrically conductive in the thickness direction was measured with a multimeter to be about 2 ohms.

Figure 2:
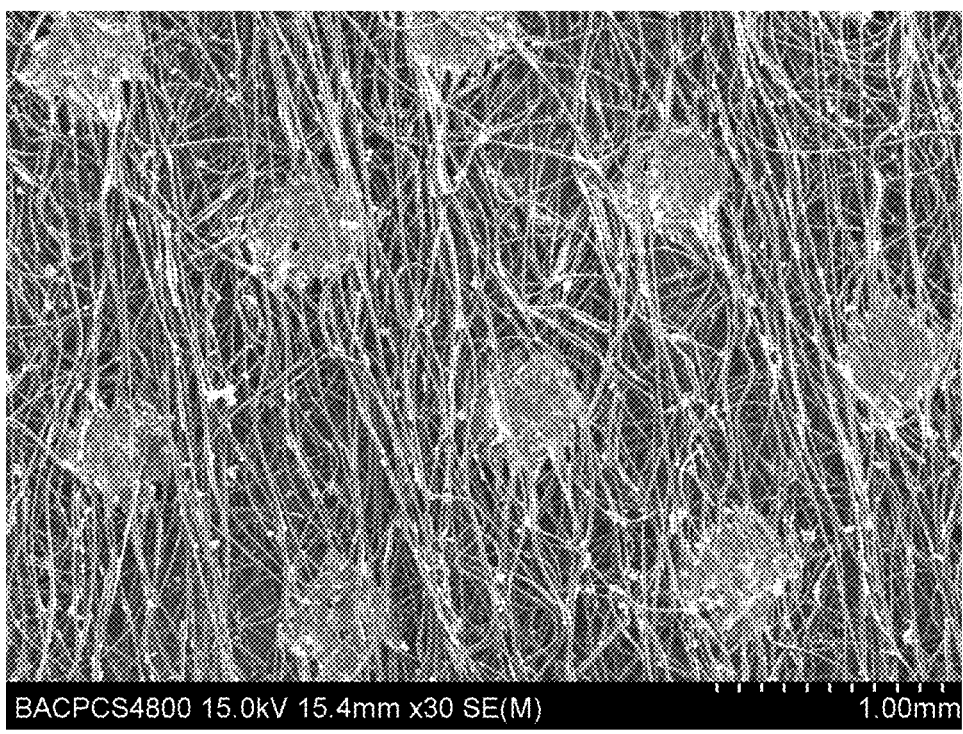
FIG. 2 is a SEM photograph of a nylon non-woven fabric coated with silver according to an embodiment of the present disclosure.

Example 4: A Laminated Composite Material
Electrically Conductive in the Thickness Direction,
Including an Interlayer Electrically Conductive
Film Preparing interlayer electrically conductive film. The interlayer electrically conductive film may be, for example, a planar material metalized on the surface, such as a porous polymer film metalized on the surface, a non-woven fabric metalized on the surface, a fabric metalized on the surface, a paper metalized on the surface, and a polymer foam metalized on the surface, etc. For example, it can be thin or ultra-thin, ultra-fine porous metal fiber felt, metal fiber fabric, or metal foam. In this example, a nylon non-woven fabric coated with silver on the surface was prepared with a thickness of about 53 μm and an areal density of about 16 g/m$^2$, wherein the diameter of nylon fiber was about 10-18 μm. The entire surface of the non-woven fabric was chemically coated with silver having an areal density of 11.6 g/m$^2$. The measured tetragonal resistance value of the nylon non-woven fabric coated with silver on the surface was 0.08Ω, and the SEM photograph was shown in FIG. 2.

The nylon non-woven fabric coated with silver on the surface obtained above was inserted one by one between the layers of T700 unidirectional carbon fiber fabric (made by Toray) (the so-called "insert" can be inserted in equal area, that is, it can be laid in a stack like the carbon fiber layer; or it can be laid in a stack selectively). Twelve layers of the T700 unidirectional carbon fiber fabric inserted with the nylon non-woven fabric coated with silver on the surface were stacked to make a so-called laminated "preform", which was then impregnated with a liquid epoxy resin curable at 120° C., that is, the so-called "liquid molding". The epoxy resin was then heated to its curing temperature to achieve curing, and finally a laminated composite material electrically conductive in the thickness direction was obtained. The electrical conductivity and interlaminar fracture toughness were measured, which were listed in Table 1 and Table 2 below. As a comparison, a laminated material without an interlayer electrically conductive film (except that the nylon non-woven fabric coated with silver on the surface was not inserted, everything else was the same as this example) was also measured for electrical conductivity and interlaminar fracture toughness, and 2 vol % graphene-modified electrically conductive laminated material (replacing the nylon non-woven fabric coated with silver on the surface with 2 vol % graphene) was measured for electrical conductivity. In Table 1, R$_x$ is the electrical conductivity in the direction of the carbon fiber in the laminate plane, R$_y$ is the electrical conductivity in the direction perpendicular to the carbon fiber in the laminate plane, and R$_z$ is the electrical conductivity perpendicular to the laminate plane (that is, in the thickness direction). It can be seen from Table 1 that compared with the laminated material without an interlayer electrically conductive film, the laminated material of this example has greatly reduced R$_x$, R$_y$, and R$_z$, wherein the degree of reduction of R$_y$ and R$_z$ is particularly significant. It can be seen from Table 2 that compared with the laminated material without an interlayer electrically conductive film, the laminated material of this example has greatly improved interlaminar fracture toughness (G$_{IC}$: Mode I interlaminar fracture toughness; G$_{IIC}$: Mode II interlaminar fracture toughness).

TABLE 1

The electrical conductivity of this example, the laminated material without an interlayer electrically conductive film, and the 2 vol % graphene-modified electrically conductive laminated material as a comparison

| | In-plane | | Out of plane | Volume fraction of fibers in the composite, V$_f$ |
|---|---|---|---|---|
| Sample | R$_x$ | R$_y$ | R$_z$ | (%) |
| Example 4 | ~0.002 | ~0.003 | 0.2~0.24 | 47.1 |
| Laminated material without an interlayer electrically conductive film | 0.022 | 198 | 98.8 | 47 |
| 2 vol % graphene-modified electrically conductive laminated material | 0.006 | | 6.45 | 56.7 |

TABLE 2

The interlaminar fracture toughness of this example and the laminated material without an interlayer electrically conductive film as a comparison

| Sample | G$_{IC}$ (J/m$^2$) | G$_{IIC}$ (J/m$^2$) |
|---|---|---|
| Example 4 | 588 ± 52 | 2302 ± 79 |
| Laminated material without an interlayer electrically conductive film | 306 | 718 |

Figure 3:
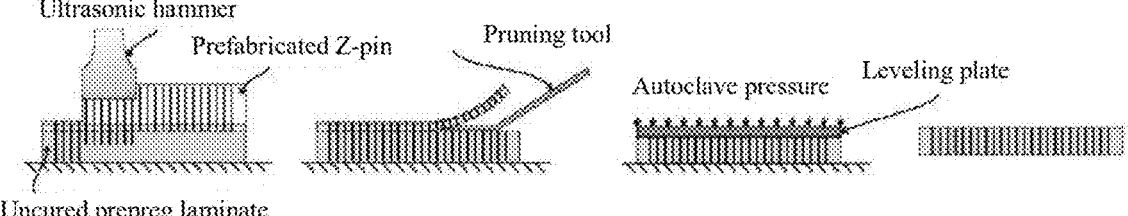
FIG. 3 is a schematic flowchart of a method for inserting Z-pin between layers according to an embodiment of the present disclosure.

Example 5: A Laminated Composite Material
Electrically Conductive in the Thickness Direction,
Including an Interlayer Electrically Conductive
Z-Pin Preparing interlayer electrically conductive Z-pin. Z-pin can usually be made of surface-metalized composite material or metal material itself; the shape of Z-pin can also be flexibly designed, such as T-shaped pin or "barbed" pin, etc., to not only increase the electrical conductivity in the thickness direction, but also enhance the mechanical connection performance. In this example, a carbon fiber composite material metalized on the surface was used as the Z-pin. With reference to the process shown in FIG. 3, the Z-pin was inserted into, but did not penetrate through, the curable resin between two adjacent layers of carbon fibers. The density of Z-pin affects the electrical conductivity of the composite material in the thickness direction, and the higher the density of Z-pin, the higher the electrical conductivity of the composite material. The density of Z-pin also affects the mechanical performance of the composite material, and an increase in the density of Z-pin will reduce the in-plane mechanical performance of the composite material.

Figure 4:
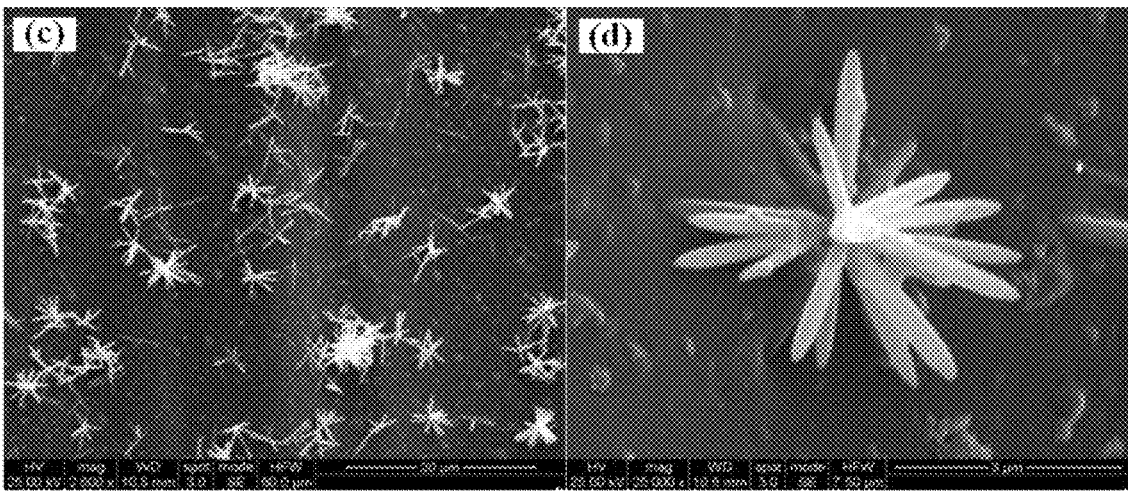
FIG. 4 is a SEM photograph of a zinc oxide whisker (ZnO Whisker) grown on epoxy prepreg according to an embodiment of the present disclosure.
Figure 5:
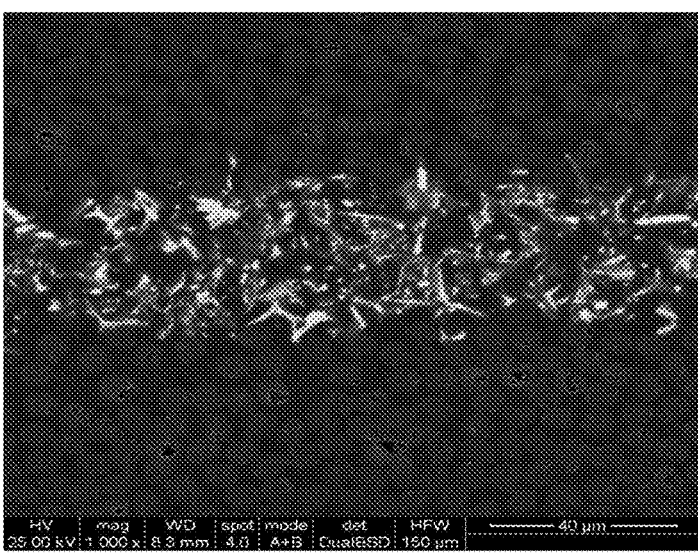
FIG. 5 is a cross-sectional view of a laminated material with a zinc oxide whisker spread between layers according to an embodiment of the present disclosure.

Example 6: A Laminated Composite Material
Electrically Conductive in the Thickness Direction,
Including an Interlayer Electrically Conductive
Particle Preparing interlayer electrically conductive particles. In order to increase the electrical conductivity in the thickness direction of a laminated material, especially to further increase the electrical conductivity in the thickness direction of an electrically conductive fabric laminated composite material, electrically conductive particles can be dispersed between the layers. The materials of the electrically conductive particles were mainly metalized three-dimensional materials such as polymer particles metalized on the surface and inorganic whiskers metalized on the surface, etc. Even, particles that are electrically conductive per se, such as metal particles, can be used directly. The method of dispersing the electrically conductive particles was not limited, and may be surface growth, sprinkling by a vibrating screen, etc., among which, a special case was the growth of electrically conductive zinc oxide (ZnO) whiskers on the surface of prepreg. FIG. 4 is a SEM photograph of ZnO Whiskers grown on carbon fiber epoxy prepreg (batch No. CCF300/5228), where photo (d) is a partial enlargement of photo (c). Zinc oxide whisker (ZnO Whisker) is electrically conductive. If ZnO Whisker is metalized in advance, its electrical conductivity will be higher. FIG. 5 is a cross-sectional view between layers of CCF300/5228 epoxy composite material after curing, in which the zinc oxide whiskers were clearly visible. These electrically conductive zinc oxides not only electrically connected the laid carbon fiber layers, but also strengthened the interlayer connection and improved the interlaminar toughness of the composite material.

Figure 6:
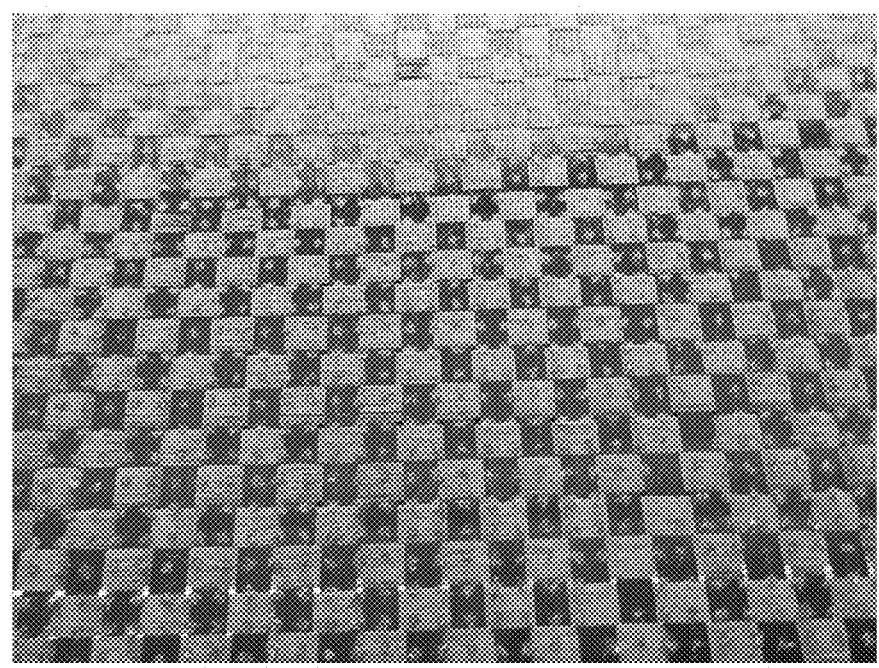
FIG. 6 is a dot matrix diagram of electrically conductive silver paste printed on T300 carbon fiber plain weave fabric according to an embodiment of the present disclosure.

Example 7: A Laminated Composite Material Electrically Conductive in the Thickness Direction, Including Interlayer Electrically Conductive Particles Similar to Example 6, another special case was the patterned uniform distribution such as a uniform surface lattice of electrically conductive particles on the surface of the substrate. The molding used for this composite material can be liquid molding, but prepreg autoclave molding was particularly suitable. Apparently, the areal density of electrically conductive particles will affect the electrical conductivity of the composite material, especially the electrical conductivity in the thickness direction. FIG. 6 was a dot matrix of electrically conductive silver paste printed on T300 carbon fiber plain fabric. The conductively treated fabric can be formed into a electrically conductive composite material by liquid molding. The measured electrical conductivity of the composite material in the thickness direction was about 10 S/cm.

Example 8: A Laminated Composite Material Electrically Conductive in the Thickness Direction, Including Both an Electrically Conductive Fiber and an Interlayer Electrically Conductive Film Step 1) was similar to Example 1, but a layer of metallic silver was vapor deposited on the surface of glass fibers to obtain electrically conductive fibers coated with silver on the surface, the diameter of which was 0.01 mm. The electrically conductive fiber coated with silver on the surface was used as the weft yarn and woven with China-made T300 unidirectional carbon fiber (Guangwei in Weihai, Shandong) to form an electrically conductive unidirectional fiber cloth. In the direction perpendicular to the length of the electrically conductive fiber coated with silver on the surface, 5 electrically conductive fibers coated with silver on the surface were included every 10 mm.

Step 2) was similar to Example 6, but a nylon non-woven fabric coated with silver on the surface was used as an electrically conductive film, wherein the nylon non-woven fabric had a thickness of about 30 μm and an areal density of about 9 g/m$^2$, the diameter of nylon fibers was about 10-15 μm, and the areal density of the electrically conductive film coated with silver was 10 g/m$^2$.

The electrically conductive unidirectional fiber cloth obtained in step 1) above and the electrically conductive film obtained in step 2) above were laid alternately layer by layer, namely, an electrically conductive film, an electrically conductive unidirectional fiber cloth, an electrically conductive film, an electrically conductive unidirectional fiber cloth, an electrically conductive film, an electrically conductive unidirectional fiber cloth, and so on. The cycle was repeated for a total of 11 times. Finally, the electrically conductive film was used as the outermost layer to obtain an electrically conductive composite material preform (a total of 12 layers of electrically conductive films and 11 layers of electrically conductive unidirectional fiber cloths alternately laid are included, and both outermost surfaces were electrically conductive films).

The above electrically conductive composite material preform was placed into a closed metal mold, and the volume fraction of carbon fibers was controlled to about 50%. A liquid epoxy resin curable at 180° C. was liquid molded and cured to finally obtain a laminated composite material electrically conductive in the thickness direction. After measurement, the electrical conductivity in the thickness direction was as high as about 150 S/m, $G_{IC}$ was as high as about 1000 J/m$^2$, and $G_{IIC}$ was as high as about 2500 J/m$^2$. The "electrically conductive fibers woven with carbon fibers" of Example 1 and the "Interlayer electrically conductive films" of Example 6 were combined in this example. The electrical conductivity of the final product in the thickness direction was higher than that of Examples 1 and 6, and the interlaminar fracture toughness ($G_{IC}$: Mode I interlaminar fracture toughness; $G_{IIC}$: Mode II interlaminar fracture toughness) of the final product was also increased compared to that of Examples 1 and 6.

The above descriptions are only exemplary embodiments of the present disclosure, and are not used to limit the protection scope of the present disclosure. The protection scope of the present invention is determined by the appended claims.

What is claimed is:

1. A thickness direction conductive laminated composite material, comprising:

laminated multiple layers of carbon fibers, wherein each layer of the laminated multiple layers of carbon fibers includes an electrically conductive fiber woven together with the carbon fibers in the respective layer, and adjacent layers of the laminated multiple layers are not woven together, and a curable resin which is disposed among the multiple layers of carbon fibers, coats the multiple layers of carbon fibers, and bonds the multiple layers of carbon fibers together, wherein the carbon fibers account for 40 vol % or more of the thickness direction conductive laminated composite material, wherein the conductive material further includes an interlayer electrically conductive particle selected from the group consisting of a polymer particle metalized on its surface, an inorganic crystal particle metalized on its surface, a hollow glass bead metalized on its surface, and a metal particle, wherein the diameter of the polymer particle metalized on its surface, the inorganic crystal particle metalized on its surface, and the metal particle is 10 μm-50 μm; and the diameter of the hollow glass bead metalized on its surface is 50 μm-100 μm, wherein the conductive material further includes an interlayer electrically conductive particle including a zinc oxide whisker metalized on its surface.

2. The thickness direction conductive laminated composite material according to claim 1, wherein in each layer of the laminated multiple layers of carbon fibers, the electrically conductive fiber is cross-woven and/or parallel-woven with the carbon fiber.

3. The thickness direction conductive laminated composite material according to claim 2, wherein the electrically conductive fiber is cross-woven with the carbon fiber; 1-5 electrically conductive fibers are included every 10 mm in the direction perpendicular to the length of the electrically conductive fiber; and the diameter of the electrically conductive fiber is 0.005 mm-0.5 mm.

4. The thickness direction conductive laminated composite material according to claim 3, wherein 3 electrically conductive fibers are included every 10 mm in the direction perpendicular to the length of the electrically conductive fiber; and the diameter of the electrically conductive fiber is 0.01 mm-0.3 mm.

5. The thickness direction conductive laminated composite material according to claim 2, wherein the electrically conductive fiber is parallel-woven with the carbon fiber; the parallel weaving includes intra-bundle weaving and/or inter-bundle weaving, wherein the intra-bundle weaving comprises commingling the electrically conductive fibers and the carbon fiber in carbon fiber bundles, and the inter-bundle weaving comprises mixedly weaving the electrically conductive fibers with carbon fiber bundles without weaving the electrically conductive fibers inside the fiber bundle of the carbon fiber; and 1-5 electrically conductive fibers are included every 10 mm in the direction perpendicular to the length of the electrically conductive fiber; and the diameter of the electrically conductive fiber is 0.005 mm-0.5 mm.

6. The thickness direction conductive laminated composite material according to claim 5, wherein 3 electrically conductive fibers are included every 10 mm in the direction perpendicular to the length of the electrically conductive fiber; and the diameter of the electrically conductive fiber is 0.01 mm-0.3 mm.

7. The thickness direction conductive laminated composite material according to claim 1, wherein the electrically conductive fiber includes at least one of: a glass fiber metalized on its surface, an organic fiber metalized on its surface, a carbon nanotube yarn metalized on its surface, and an ultrafine metal fiber.

8. The thickness direction conductive laminated composite material according to claim 1, wherein the conductive material further includes an interlayer electrically conductive film including at least one of: a porous polymer film metalized on its surface, a non-woven fabric metalized on its surface, a fabric metalized on its surface, a paper metalized on its surface, and a polymer foam metalized on its surface.

9. The thickness direction conductive laminated composite material according to claim 8, wherein the thickness of the interlayer electrically conductive film is 0.01 mm-0.2 mm.

10. The thickness direction conductive laminated composite material according to claim 1, wherein the conductive material further includes an interlayer electrically conductive Z-pin including a composite Z-pin metalized on its surface or a metal Z-pin, wherein the Z-pin is inserted into, but does not penetrate through, the curable resin between two adjacent layers of carbon fibers.

11. The thickness direction conductive laminated composite material according to claim 1, wherein the curable resin includes epoxy resin, vinyl resin, bismaleimide, polyimide, unsaturated polyester, or benzoxazine.

12. The thickness direction conductive laminated composite material according to claim 1, wherein the thickness direction conductive laminated composite material is used in the manufacture of aircraft airframes.

* * * * *